United States Patent [19]

Schwarstein et al.

[11] Patent Number: 5,238,166

[45] Date of Patent: Aug. 24, 1993

[54] SEALING ARRANGEMENT FOR RETAINING LIQUID LUBRICANT IN SELECTED AREAS OF A MACHINE

[75] Inventors: Egbert Schwarstein, Nuremberg; Helmut Hölzel, Thalmässing, both of Fed. Rep. of Germany

[73] Assignee: Siemens Aktiengesellschaft, Munich, Fed. Rep. of Germany

[21] Appl. No.: 978,066

[22] Filed: Nov. 18, 1992

Related U.S. Application Data

[63] Continuation of Ser. No. 759,895, Sep. 13, 1991, abandoned.

[30] Foreign Application Priority Data

Sep. 21, 1990 [DE] Fed. Rep. of Germany ....... 4029990

[51] Int. Cl.$^5$ .................. F16J 15/48; F16C 33/74
[52] U.S. Cl. .................................. 277/53; 277/25; 277/55; 277/67; 384/144; 384/480
[58] Field of Search .................. 277/53, 55, 56, 68, 277/25, 67, 70, 71, 79; 384/144, 145, 146, 480, 474

[56] References Cited

U.S. PATENT DOCUMENTS

| 2,245,281 | 6/1941 | Klopak | 277/67 X |
| 2,281,905 | 5/1942 | Young | 286/5 |
| 2,524,124 | 10/1950 | Gyana | 277/67 |
| 4,462,515 | 9/1983 | Malott | 277/67 X |
| 4,513,975 | 10/1950 | Hauser et al. | 277/75 |

FOREIGN PATENT DOCUMENTS 1475600 1/1969 Fed. Rep. of Germany .
8715621 3/1988 Fed. Rep. of Germany .

OTHER PUBLICATIONS

Machine Design—The Electric Motor Book, Chapter 8, pp. 42–43, James Penney, Westinghouse Electric Corp., Buffalo, N.Y., 1961.
Kugellager-Zeitschrift, No. 4, 1961, pp. 79, 83.

*Primary Examiner*—William A. Cuchlinski, Jr.
*Assistant Examiner*—Daniel G. DePumpo
*Attorney, Agent, or Firm*—Kenyon & Kenyon

[57] ABSTRACT

A sealing assembly for regulating the flow of lubricant to a rotating shaft and to the bearings which support it. The shaft is supported on rolling-contact bearings to which are coupled bearing collars. The bearing collars serve as spray-off edges for removing lubricant from the bearings, which after removal, is received in a groove formed between the bearing and a seal member. This groove is in liquid communication with an opening to the surface of the shaft which, as it rotates, centrifuges lubricant from the groove. The shaft is encircled by the seal member which includes several chambers for receiving lubricant sprayed off the shaft at several spray-off edges. At the end of the seal member furthest from the rolling-contact bearings an outlet for the lubricant of the same size as the inlet is provided, thereby reducing pressure differences between the inlet and the outlet.

14 Claims, 1 Drawing Sheet

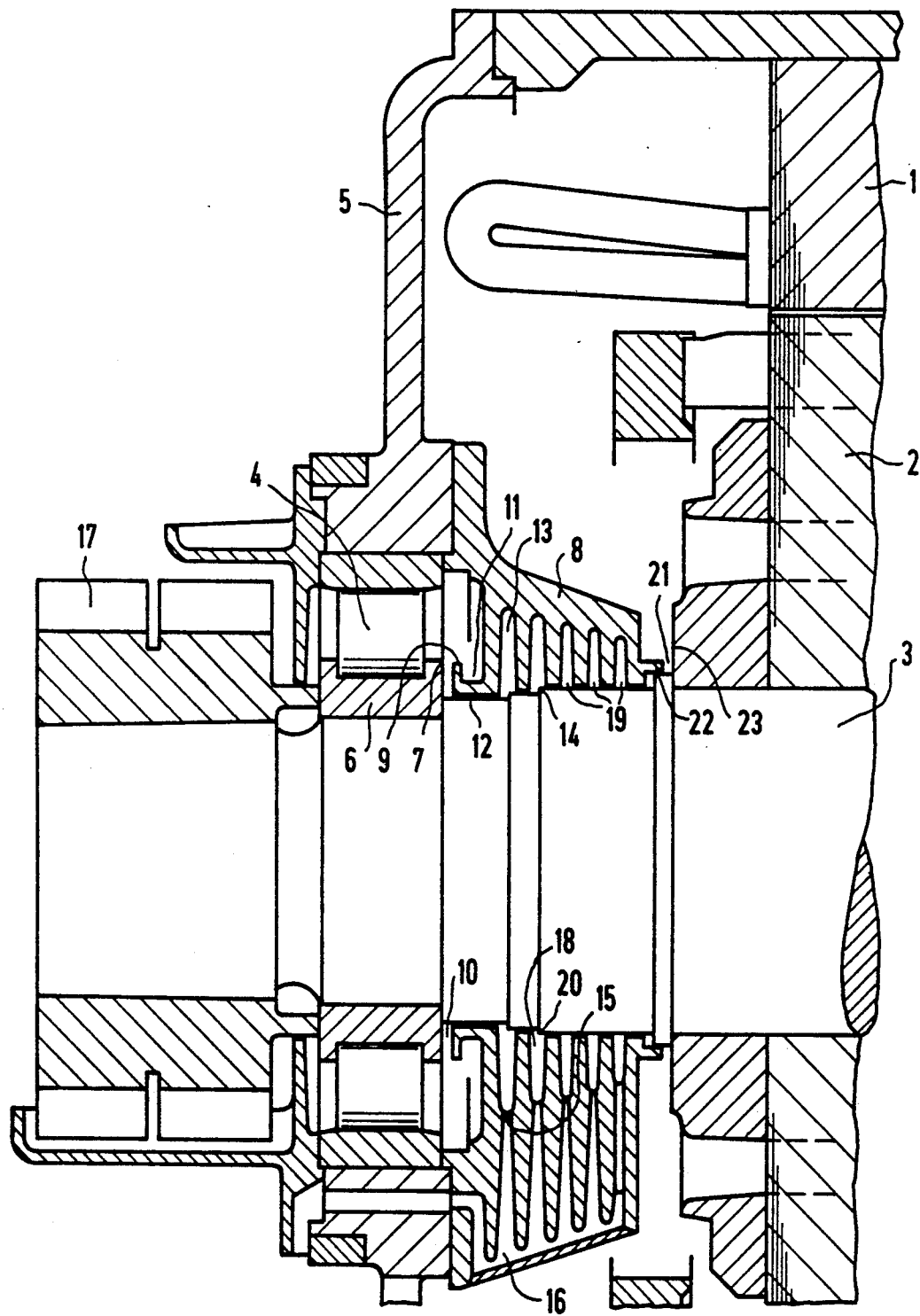

SEALING ARRANGEMENT FOR RETAINING LIQUID LUBRICANT IN SELECTED AREAS OF A MACHINE

This application is a continuation of application Ser. No. 07/759,895, filed Sep. 13, 1991, now abandoned.

BACKGROUND OF THE INVENTION

The invention relates to a sealing arrangement for retaining liquid lubricant in selected areas of a machine.

Such a sealing arrangement is disclosed by the DE-U-87 15 621. This sealing arrangement is comprised of a labyrinth seal and several separate structural members, whose function it is to spray off the oil that has penetrated into the sealing gap.

The object of the invention is to further develop a sealing arrangement of the type described at the outset to render possible an effective sealing [action] using a one-piece labyrinth seal member.

SUMMARY OF THE INVENTION

The present invention is directed to a sealing apparatus for retaining liquid lubricant in selected areas of a machine. The apparatus comprises a shaft rotatably mounted, for rotation relative to a stationary housing. The shaft defines inlet and outlet portions separated axially along the shaft, and the shaft diameter increases in at least one discrete gradation between the inlet and outlet portions of the shaft. These gradations provide spray-off edges each of which directs lubricant to a respective chamber, or plurality of chambers, and, subsequently, to a respective drain port, in a seal. The seal is mounted around the shaft and coupled to the stationary housing and defines, adjacent to the inlet portion of the shaft, an annular rim.

The sealing apparatus according to the present invention further comprises at least one rolling-contact bearing for supporting the rotatably mounted shaft. Each rolling-contact bearing is lubricated by the liquid lubricant, and is mounted adjacent the inlet portion of the shaft within the stationary housing. A bearing collar is coupled to each rolling-contact bearing and defines a protrusion which extends toward the second axis on the end of the bearing collar adjacent the inlet portion of the shaft. This protrusion is separated by a distance along the axis of the shaft from the annular rim. This separation thereby defines an inlet for the liquid lubricant.

The seal member further defines an outlet for the liquid lubricant between the seal member and a corresponding surface on the shaft formed by one of the discrete increases in the diameter of the shaft. The seal and the corresponding surface on the shaft are separated by a distance substantially equal to that between the annular rim and the protrusion of each roller bearing. By providing an inlet and an outlet of substantially the same size the pressure differential between the openings is eliminated.

A bearing collar situated on the inner ring of the rolling-contact bearing provides a very effective spray-off edge. This spray-off edge enables a very large portion of the oil emerging out of the bearing to be centrifuged off and thus kept away from the inlet slit of the labyrinth seal. Due to the fact that the inlet and outlet slits of the labyrinth seal have the same diameter, no pressure differences develop between the inlet and outlet side of the labyrinth seal which could result in oil being delivered. Consequently, an adequate sealing action is attained by means of the individual sealing gaps of the labyrinth seal.

Adjoining the annular rim of the labyrinth seal, it is advantageous to have an oil-collecting groove at the periphery of the labyrinth seal member. The size of the oil-collecting groove is dimensioned in dependence upon the quantity of oil that is centrifuged off at the radial gap. This also ensures that the oil that is centrifuged off is kept away from the inlet slit of the labyrinth seal. The way the oil-collecting groove is designed inevitably results in a relatively long axial gap in the inlet area of the labyrinth seal. The sealing action is likewise improved as a result.

As the shaft rotates oil is sprayed off the shaft at each grading in shaft diameter. The quantity of oil sprayed off at these gradings decreases as the distance from the inlet increases.

The volume of each chamber, each of which is dimensioned in accordance with the quantity of oil that accumulates, ensures that the oil in each chamber can be completely accommodated and will not be pressed further to the outside. The volume of the chambers can thereby diminish toward the outlet side, so that one can economize on the [amount of] space needed for the labyrinth seal.

Roller bearings of the N type of construction already come equipped with a bearing collar on the inner ring. Thus, a special bearing design is not needed to provide the necessary bearing collar.

The object of the invention shall be clarified in greater detail in the following based on an exemplified embodiment depicted in the drawing.

BRIEF DESCRIPTION OF THE DRAWING

FIG. 1 shows a cross-section of a seal embodying the present invention.

DETAILED DESCRIPTION 1 designates the stator and 2 the rotor of an electrical motor. The shaft 3 of the rotor 2 is supported by means of a roller bearing 4 of the N type of construction in a bearing bracket 5, which is secured to the motor housing. These types of roller bearings feature a bearing collar 7 on the inner ring 6. Towards the side of the rotor, the bearing bore which accommodates the roller bearing 4 is sealed by a labyrinth seal 8 that functions as a bearing cover.

An annular rim 9, which extends parallel to the bearing collar 7 of the roller bearing 4, is formed on the body of the labyrinth seal 8. The axial extent of the labyrinth seal 8 is dimensioned so that, together with the bearing collar 7, the annular rim 9 forms a narrow, radial inlet slit 10. Adjoining the annular rim 9, an oil-collecting groove 11 is formed on the periphery of the body of the labyrinth seal 8. Oil that is centrifuged off from the bearing collar 7 to the outside is collected in this oil-collecting groove 11 and flows off in a downward direction. The formation of this oil-collecting groove 11 results in a relatively long axial gap 12 in the inlet area of the labyrinth seal 8. This axial gap hinders a passage of the oil.

Adjoining this axial gap 12 and provided in the body of the labyrinth seal 8, is a first chamber 13. A first grading 14 of the shaft 3 is allocated to this first chamber 13. The shaft grading 14 forms a spray-off edge, through which means the oil that has advanced up to this edge is centrifuged off into the first chamber 13.

The oil flows from the walls of this chamber 13 through a drain port 15 toward a collecting channel 16. This collecting channel 16 discharges into the space of a gear housing which is connected to the motor housing and is not depicted in the drawing. Only the pinion 17 that is connected to the shaft 3 is shown from the gear unit.

A second chamber 18 and contiguous to this, additional chambers 19 are formed in the body of the labyrinth seal 8 and are set apart axially from the first chamber 13. A second grading 20 of the shaft 3 is allocated to the second chamber 19. No further shaft gradings are provided in the area of the additional chambers 19. However, it is possible to introduce gradings on the shaft 3 in this area as well.

The outlet slit 21 of the labyrinth seal 8 is formed between an axially protruding rim 22 premolded on the body of the labyrinth seal 8 and the one front end 23 of the rotor 2. Where the outlet slit 21 ends, it has the same diameter as the inlet slit 10. In this manner, pressure differences between the inlet and outlet side of the labyrinth seal 8 are avoided and, consequently, one obtains a labyrinth which is substantially neutral with respect to delivery.

In the described sealing arrangement, structural members which exist in any case, such as the roller bearing 4 and the shaft 3, are constructed together with the labyrinth seal 8 in a way which allows a very effective sealing action to be achieved. Thus, additional structural parts are not needed.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A sealing apparatus for retaining liquid lubricant in selected areas of machine, comprising:
    a shaft rotatably mounted, for rotation relative to a stationary housing, wherein the shaft defines a first axis central to the shaft, and wherein the shaft further defines inlet and outlet portions separated axially along the shaft, and wherein the shaft diameter increases in a plurality of discrete gradations between the inlet and outlet portions of the shaft;
    at least one rolling-contact bearing, to be lubricated by the liquid lubricant, mounted adjacent the inlet portion of the shaft within the stationary housing for supporting the rotatably mounted shaft therein, wherein each rolling-contact bearing defines a second axis central to the roller bearing;
    a bearing collar adjacent each rolling-contact bearing and defining a protrusion extending away from the first axis and toward the second axis, said protrusion being located on the end of the bearing collar adjacent the inlet portion of the shaft;
    a labyrinth seal member mounted around the shaft, wherein the labyrinth seal member defines, adjacent to the inlet portion of the shaft, an annular rim which is separated by a distance along the axis of the shaft from the protrusion of each bearing collar, wherein at least a portion of said annular rim and a corresponding portion of said protrusion are located substantially equidistant from said first axis, said separation defining a radially extending inlet for the liquid lubricant;
    a plurality of chambers disposed within the labyrinth seal member, wherein the chambers are disposed between the inlet and outlet portions of the shaft and open onto the surface of the shaft, for receiving lubricant removed from the shaft;
    at least one drain port for the liquid lubricant in liquid communication with at least one of the chambers defined within the labyrinth seal member; and
    an outlet for the liquid lubricant of a diameter substantially equal to that of the inlet for the liquid lubricant.

2. The sealing arrangement according to claim 1, wherein the labyrinth seal member further defines, adjacent the annular rim defined by the labyrinth seal member and in liquid communication with the inlet, a groove for collecting liquid lubricant, said groove being dimensioned based on the quantity of liquid lubricant that is centrifuged off at the inlet through the rotation of the shaft.

3. The sealing apparatus according to claim 1, wherein the size of each chamber in the labyrinth seal member is dimensioned to be large enough to accommodate the maximum amount of liquid lubricant present, at each chamber's respective location along the shaft, during operation of the machine.

4. The sealing apparatus of claim 1, wherein the outlet for the liquid lubricant is defined between the labyrinth seal member and a protrusion from the shaft.

5. The sealing apparatus according to claim 1, further comprising a plurality of drain ports, each drain port being in fluid communication with a respective chamber defined within the labyrinth seal member for receiving lubricant therefrom.

6. The sealing apparatus according to claim 1, wherein at least one of the rolling-contact bearings is a rolling-contact bearing of the N type of construction.

7. The sealing apparatus according to claim 2, wherein the size of each chamber in the labyrinth seal member is dimensioned to be at least large enough to accommodate the maximum amount of liquid lubricant present, at each chamber's respective location along the shaft, during operation of the machine.

8. A sealing apparatus for retaining liquid lubricant in selected areas of a machine, comprising:
    a shaft rotatably mounted, for rotation relative to a stationary housing, wherein the shaft defines a first axis central to the shaft, wherein the shaft further defines inlet and outlet portions separated axially along the shaft, and wherein the shaft diameter increases in a plurality of discrete gradations between the inlet and outlet portions of the shaft, wherein at least one of these discrete gradations in shaft diameter forms a spray-off edge for removing lubricant from the shaft;
    at least one rolling-contact bearing, to be lubricated by the liquid lubricant, mounted adjacent the inlet portion of the shaft within the stationary housing for supporting the rotatably mounted shaft therein, wherein each rolling-contact bearing defines a second axis central to the roller bearing;
    a bearing collar adjacent each rolling-contact bearing and defining a protrusion extending away from the first axis and toward the second axis, said protrusion being located on the end of the bearing collar adjacent the inlet portion of the shaft, wherein each bearing collar defines a spray-off edge for removing lubricant from a respective rolling-contact bearing;
    a seal member mounted around the shaft and coupled to the stationary housing, wherein the seal member defines, adjacent to the inlet portion of the shaft, an annular rim which is separated by a distance along the axis of the shaft from the protrusion of each bearing collar, wherein at least a portion of said annular rim and a corresponding portion of said protrusion are located substantially equidistant from said first axis, said separation defining a radially extending inlet for the liquid lubricant;

a plurality of chambers formed in the seal member, said chambers being disposed between the inlet and outlet portions of the shaft and opening onto the surface of the shaft, wherein each chamber projects into the seal member in a direction substantially away from the first axis, and wherein at least one of the chambers is located adjacent a spray-off edge for receiving lubricant removed from the shaft at the spray-off edge;

a plurality of drain ports for the liquid lubricant, each drain port corresponding to a respective chamber defined at the seal member; and an outlet for the liquid lubricant having a diameter substantially equal to that of the inlet for the liquid lubricant.

9. The sealing apparatus according to claim 8, wherein the outlet for the liquid lubricant is formed between a surface defined by the seal member and a protrusion of the shaft.

10. The sealing arrangement according to claim 8, wherein the seal member further defines, adjacent the annular rim defined by the labyrinth seal member and in liquid communication with the inlet, a groove for collecting liquid lubricant, said groove being dimensioned based on the quantity of liquid lubricant that is centrifuged off at the inlet through the rotation of the shaft.

11. The sealing apparatus according to claim 8, wherein the size of each chamber in the seal member is dimensioned to be large enough to accommodate the maximum amount of liquid lubricant present, at each chamber's respective location along the shaft, during operation of the machine.

12. The sealing arrangement according to claim 11, wherein the seal member further defines, adjacent the annular rim defined by the labyrinth seal member and in liquid communication with the inlet, a groove for collecting liquid lubricant, said groove being dimensioned based on the quantity of liquid lubricant that is centrifuged off at the inlet through the rotation of the shaft.

13. The sealing apparatus according to claim 8, wherein the machine is powered by electricity.

14. The sealing apparatus according to claim 8, wherein at least one of the rolling-contact bearings is a rolling-contact bearing of the N type of construction.

* * * * *